Jan. 6, 1942.  G. F. NADEAU  2,269,220

PHENOL-FORMALDEHYDE PHOTOGRAPHIC SUB

Filed Aug. 14, 1940

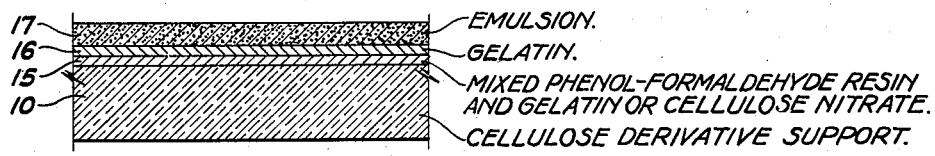

FIG. 1

17 — EMULSION.
16 — GELATIN.
15 — MIXED PHENOL-FORMALDEHYDE RESIN AND GELATIN OR CELLULOSE NITRATE.
10 — CELLULOSE DERIVATIVE SUPPORT.

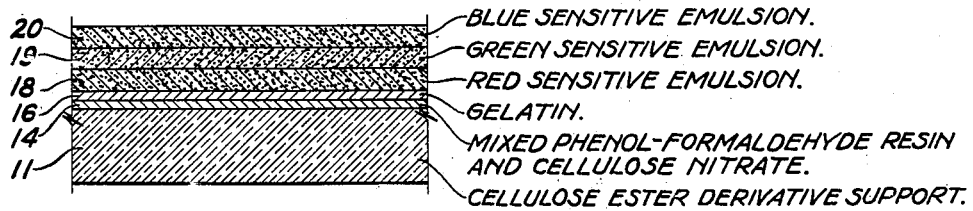

FIG. 2

20 — BLUE SENSITIVE EMULSION.
19 — GREEN SENSITIVE EMULSION.
18 — RED SENSITIVE EMULSION.
16 — GELATIN.
14 — MIXED PHENOL-FORMALDEHYDE RESIN AND CELLULOSE NITRATE.
11 — CELLULOSE ESTER DERIVATIVE SUPPORT.

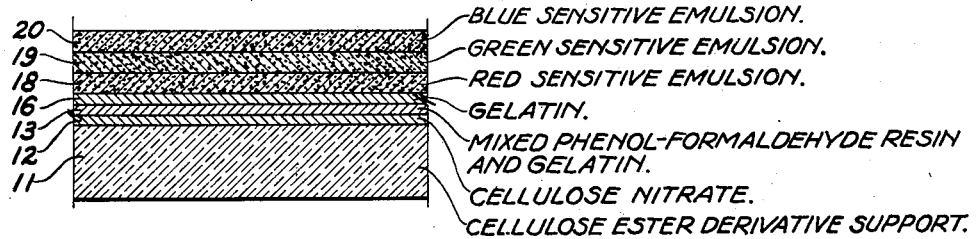

FIG. 3

20 — BLUE SENSITIVE EMULSION.
19 — GREEN SENSITIVE EMULSION.
18 — RED SENSITIVE EMULSION.
16 — GELATIN.
13 — MIXED PHENOL-FORMALDEHYDE RESIN AND GELATIN.
12 — CELLULOSE NITRATE.
11 — CELLULOSE ESTER DERIVATIVE SUPPORT.

GALE F. NADEAU
INVENTOR

BY Rawlin M. Perrine
R. Frank Smith
ATTORNEYS

Patented Jan. 6, 1942

2,269,220

UNITED STATES PATENT OFFICE 2,269,220

PHENOL-FORMALDEHYDE PHOTOGRAPHIC SUB

Gale F. Nadeau, Rochester, N. Y., assignor to Eastman Kodak Company, Rochester, N. Y., a corporation of New Jersey Application August 14, 1940, Serial No. 352,568

6 Claims. (Cl. 95—2)

This invention relates to a method for subbing photographic film and particularly to a method of subbing a film designed to record a colored photographic image.

The problem of producing a photographic film having the required degree of flexibility is extremely difficult to solve. When an ordinary photographic emulsion is laid directly upon a cellulose organic derivative support the product either peels or exhibits a high degree of brittleness. In order to compensate for this undesirable quality of the film it is customary to adhesively join the emulsion to the support through the agency of a material which will impart a high degree of flexibility to the film.

In the case of a photographic film designed to receive colored images an additional problem arises. Ordinarily colored materials such as dyes are incorporated in the emulsion layers to color photographic images or to regulate the sensitivity of the layers to light of a given wavelength or, in insensitive layers, to screen out light of undesirable wavelengths as for instance in antihalation or filter layers. The coloring matter in a sensitive or insensitive layer adjacent to the subbing layer frequently tends to diffuse into the subbing layer, resulting in a staining of this layer and fading of the dye in the emulsion layer.

It is therefore the object of the present invention to provide a photographic film with a sub layer which imparts the property of flexibility and adequate adhesion between layers. A further object is to provide a photographic film designed to record color images with a subbing layer which will not be susceptible to coloration by dyes or other diffusible coloring matter, and therefore will not cause a fading of the colored image in adjacent layers.

These objects are accomplished in my invention by providing a photographic film with a subbing layer consisting of a mixture of an organic-solvent-soluble phenol-formaldehyde synthetic resin and gelatin or cellulose nitrate. The subbing layer is placed between the emulsion and the support of the film and over this may be coated other emulsion layers. Usually red, green, and blue sensitive emulsions are coated in order upon the subbing layers with the red sensitive emulsion next to the sub layer. This order may, however, be reversed.

In the accompanying drawing are illustrated several film structures in accordance with this invention.

Fig. 1 illustrates the general method of combining emulsion, subbing, and support layers.

Fig. 2 illustrates the manner in which the emulsion layers of a multilayer color film are joined to the support by means of subbing layer consisting of a mixture of a resin and cellulose nitrate.

Fig. 3 illustrates the method of joining the sensitive layers of a multi-layer color film to the support by means of a mixed resin and gelatin sub.

As illustrated in Fig. 1, the cellulose derivative support 10 carries the mixed resin and gelatin or cellulose nitrate subbing layer 15 and over this the gelatin layer 16 and emulsion layer 17.

Fig. 2 illustrates the use of an adhesive low dye retention layer 14 consisting of a mixture of an organic-solvent-soluble phenol-formaldehyde resin and cellulose nitrate which joins the support 11, consisting of a cellulose ester derivative, to the gelatin layer 16 and the differentially sensitized red, green, and blue sensitive emulsion layers 18, 19 and 20, respectively.

Fig. 3 illustrates the use of an adhesive low dye retention layer 13 consisting of a mixture of an organic-solvent-soluble phenol-formaldehyde resin and gelatin which joins the support 11, consisting of a cellulose ester derivative, and the cellulose nitrate layer 12, to the gelatin layer 16 and the differentially sensitized red, green, and blue sensitive emulsion layers 18, 19, and 20 respectively.

In subbing a film according to my invention a support of any suitable composition is coated with a subbing layer consisting of a mixture of an organic-solvent-soluble phenol-formaldehyde resin and gelatin or cellulose nitrate deposited from a solvent solution. Over this layer are laid such sensitive silver halide emulsion layers as are required. The support may consist of any cellulose organic or inorganic ester such as cellulose acetate, cellulose nitrate, or mixed esters such as, cellulose acetate-phosphate, cellulose acetate-propionate or cellulose acetate-butyrate. Also the support may consist of an opaque material such as paper, metal, or glass. In subbing a safety film support of cellulose acetate or mixed esters of cellulose, I may apply a nitrate sub to the support before laying down the mixed resin and gelatin subbing layer. This is followed by a gelatin layer and by the emulsion layers.

The phenol-formaldehyde resins which I find to be useful in subbing layers are those which are available to the trade under such names as Durez and Bakelite such as the organic-solvent-soluble resins known as Durez 570 and Bakelite XR3189. Since not all phenol-formaldehyde resins are of the solvent-soluble type, my invention is limited to the use of the solvent-soluble tar acid resins popularly known as "A" stage resins. I also contemplate the use of modified phenol-formaldehyde resins. These resins are more fully described in the United States Tariff Commission Report No. 131 "Synthetic Resins and their Raw Materials."

My subbing technique is equally applicable to synthetic resin supports carrying sensitive gelatin or cellulosic emulsions or to cellulosic supports carrying sensitive cellulosic, gelatin, or synthetic resin emulsions.

If, in an alternative manner, a color film similar to those shown in Fig. 1 or Fig. 2 is to carry additional layers such as light screening layers separating the three sensitive emulsions, these layers may be comprised of an organic-solvent-soluble phenol-formaldehyde resin.

In films designed to record color images a dye may be incorporated into the resin sub layer or into the support to protect against halation effects. Films which are to be double coated may be subbed on both sides of the support with my mixed resin and gelatin or cellulose nitrate composition before coating with sensitive emulsions.

The solvents which I find mose useful for applying phenol-formaldehyde resins to film supports are mixtures of acetone and methanol or aqueous methanol. The concentration of the subbing solution may vary from 1–6%, or more, of mixed resin and cellulose nitrate or gelatin in solution, depending upon the speed of coating.

The cellulose nitrate which I use in conjunction with gelatin or resins in subbing layers, or in subbing layers alone are explained in Example 2, is a high alcohol soluble, low viscosity type which may have the following composition:

| | Range |
|---|---|
| Alcohol solubility_____per cent__ | 30 –100 |
| Viscosity (dropping ball)_____ | 2 – 5 |
| Nitrogen _____ | 11.0– 12.0 |

The ratio of resin to gelatin or cellulose nitrate in the undercoat is preferably 1 part of resin to about 5 or 7 parts of gelatin or nitrate.

The "dropping ball" method of determining viscosity is described in my prior U. S. Patent No. 2,169,004, granted August 8, 1939.

The gelatin sub employed as illustrated in the drawing may be coated from a solution having the following composition:

| | Per cent |
|---|---|
| Gelatin _____ | 1.2 |
| Acetic acid _____ | 2 |
| Water_____ | 12 |
| Methanol_____ | 84.8 |

The emulsion layers coated over the gelatin subbing layer may consist of ordinary silver halide emulsions or may be sensitized to record light of various wavelengths. In multilayer color films the emulsions may be differentially sensitized and may contain coloring matter.

The following examples further illustrate, but in no way exhaust, the possibilities of my invention.

Example I

A photographic film base of cellulose acetate containing 38–42% acetyl was coated with the following subbing solution:

| | Grams |
|---|---|
| Durez 570 (phenol-formaldehyde) _____ | 0.9 |
| Cellulose nitrate _____ | 6.3 |
| Acetone _____ | 96.4 |
| Methanol _____ | 96.4 |

This solution was coated at a linear speed of 6 feet per minute and was dried after coating. A gelatin subbing solution of the following composition was then applied.

| | Per cent |
|---|---|
| Gelatin _____ | 1.2 |
| Acetic acid _____ | 2 |
| Water_____ | 12 |
| Methanol_____ | 84.8 |

Over the gelatin layer were coated differentially sensitized silver halide emulsion layers. This film exhibited satisfactory flexibility and after the completion of exposure and processing operations, it was found that the resin subbing layer did not contain any dye. Substituting Bakelite XR3189 for Durez 570 it was found that comparable results were obtained.

Example II

A photographic film base of cellulose acetate-propionate containing 16% propionyl and 29% acetyl was coated with the following subbing solution:

| | Grams |
|---|---|
| Cellulose nitrate _____ | 3 |
| Acetone _____ | 14.5 |
| Methyl Cellosolve _____ | 19.5 |
| Methanol_____ | 63 |

This coating was allowed to dry and coated with a mixed gelatin and resin subbing solution of the following composition:

| | Grams |
|---|---|
| Gelatin _____ | 1.2 |
| Bakelite XR3189 (phenol-formaldehyde) __ | .25 |
| Methanol _____ | 83.75 |
| Water _____ | 14.8 |

After drying this coating, a gelatin subbing solution and differentially sensitized emulsion layers having the same composition as described in Example I were applied.

In a similar manner Durez 570 was utilized with the result that good adhesion between layers and low dye retention was attained.

The film resulting from the application of this subbing technique shows little or no tendency for dye stain. During processing operations whereby colored images were formed in the emulsion layers it was found that dyes contained in the emulsion layers did not diffuse into the resin sub layer. While my invention principally treats on the subject of adhesively subbing film supports, and this is my preferred embodiment, it is to be noted that another feature is the use of resinous adhesive low dye retention subbing layers of the composition I have described.

While I have referred to the use of a subbing process as applied to films capable of recording colored images, my process is equally applicable to films designed to record black-and-white silver images.

It is to be understood that the above examples, ranges, and methods of procedure are illustrative only and that my invention is to be taken as limited only by the scope of the appended claims.

What I claim is:

1. A photographic film of satisfactory flexibility for use in color photography having an adhesive, low-dye-retention subbing layer, which comprises, in order, a cellulose organic acid ester support, a subbing layer comprising a mixture of an organic-solvent-soluble phenol-formaldehyde resin and a material selected from the group consisting of gelatin and cellulose nitrate, a gelatin layer, and a light-sensitive colloid layer.

2. A photographic film of satisfactory flexibility for use in color photography having an adhesive low-dye-retention subbing layer, which comprises, in order, a cellulose organic acid ester support, a subbing layer comprising a phenol-formaldehyde resin soluble in a mixture of methanol and water and gelatin, a gelatin layer, and a light sensitive colloid layer.

3. A photographic film of satisfactory flexibility for use in color photography having an adhesive, low-dye-retention subbing layer, which comprises, in order, a cellulose organic acid ester support, a subbing layer comprising a mixture of an organic-solvent-soluble phenol-formaldehyde resin and cellulose nitrate, a gelatin layer, and a light sensitive colloid layer.

4. A photographic film of satisfactory flexibility for use in color photography having an adhesive, low-dye-retention, subbing layer comprising a cellulose organic acid ester support and a plurality of colloid layers sensitized to record different spectral regions adhesively joined to the support by a subbing layer comprising a mixture of an organic-solvent-soluble phenol-formaldehyde resin and a material selected from the group consisting of gelatin and cellulose nitrate.

5. A photographic film of satisfactory flexibility for use in color photography having an adhesive, low-dye-retention subbing layer, which comprises, in order, a cellulose organic acid ester support, a cellulose nitrate layer, a subbing layer comprising a mixture of an organic-solvent-soluble phenol-formaldehyde resin and gelatin, a gelatin layer, and red, green, and blue sensitive colloid layers.

6. A photographic film of satisfactory flexibility for use in color photography having an adhesive low-dye-retention subbing layer, which comprises, in order, a cellulose organic acid ester support, a subbing layer comprising a mixture of an organic-solvent-soluble phenol-formaldehyde resin and cellulose nitrate, a gelatin layer, and red, green, and blue sensitive colloid layers.

GALE F. NADEAU.